(12) United States Patent
Kim et al.

(10) Patent No.: US 6,794,324 B1
(45) Date of Patent: Sep. 21, 2004

(54) LOW TEMPERATURE SINTERABLE AND LOW LOSS DIELECTRIC CERAMIC COMPOSITIONS AND METHOD THEREOF

(75) Inventors: Yoon-Ho Kim, Seoul (KR); Hyo-Tae Kim, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 41 days.

(21) Appl. No.: 10/018,426

(22) PCT Filed: Aug. 30, 2000

(86) PCT No.: PCT/KR00/00983
§ 371 (c)(1), (2), (4) Date: Apr. 3, 2002

(87) PCT Pub. No.: WO01/81269
PCT Pub. Date: Nov. 1, 2001

(30) Foreign Application Priority Data

Apr. 21, 2000 (KR) ........................................ 2000-21259

(51) Int. Cl.⁷ ..................... C04B 35/462; C04B 35/465; H01G 4/10; H01G 4/30
(52) U.S. Cl. .................... 501/134; 501/136; 361/321.4; 361/321.5
(58) Field of Search ................................ 501/134, 136; 361/321.4, 321.5

(56) References Cited

U.S. PATENT DOCUMENTS 5,767,030 A * 6/1998 Kim et al. .................. 501/136
5,866,492 A    2/1999 Kim et al.

FOREIGN PATENT DOCUMENTS

| JP | 06-312449    | 11/1994 |
| JP | 06-312449 A  | 11/1994 |
| KR | 93-0020437   | 10/1993 |
| KR | 93-0020437 A | 10/1993 |
| KR | 95-0045810   | 11/1995 |
| KR | 95-0045810 A | 11/1995 |
| KR | 96-0050579   | 10/1996 |
| KR | 96-0050579 A | 10/1996 |
| KR | 1019980141401 | 3/1998 |
| KR | 1019980162876 | 9/1998 |
| KR | 1019981078328 | 11/1998 |
| KR | 1019990225881 | 7/1999 |
| KR | 1020000009735 | 2/2000 |

OTHER PUBLICATIONS

CAPLUS 2003:354765, Kim et al, "Structure and microwave dielectric properties . . . ", 2003.*
CAPLUS 1999:593074, Kim et al, "Microwave dielectric ceramics . . . " 1999.*
CAPLUS 1999:818005, Kim et al. "Low–temperature sintering and . . . " 1999.*
CAPLUS 2000:41577, Kim et al., "Low–fired (Zn,Mg)TiO3 microwave dielectrics" 2000.*
CAPLUS 2000:896800, Purvanova et al, "Preparation and some properties of . . . " 1999.*
CAPLUS 1998:395995, Kim et al, "Microsturcture and microwave dielectric properties . . . " 1998.*
CAPLUS 1977:537379, Sheinkman et al, "Phase formation sequence during the reaction . . . " 1977.*

* cited by examiner

*Primary Examiner*—David Brunsman
(74) *Attorney, Agent, or Firm*—Morrison & Foerster LLP (57) ABSTRACT

A low loss high-frequency dielectric ceramic composition for sintering at a low temperature and method of manufacturing the same which is characterized in that excellent dielectric properties such as a much lower sintering temperature and higher quality coefficient and dielectric constant, compared to conventional high-frequency ceramic composition, a stabilized temperature coefficient, and a temperature compensating property varied according to a composition, are implemented using a low-priced material such as $ZnO-MO$ (M=Mg, Co, Ni)—$TiO_2$. In addition, Ag, Cu, an alloy thereof, or an Ag/Pd alloy can be used as an internal electrode. Thus, the composition of the present invention can be used as a dielectric material for all sorts of high-frequency devices, such as a stacked chip capacitor, stacked chip filter, stacked chip capacitor/inductor composite device and module, low temperature sintered substrate, resonator or filter and ceramic antenna.

10 Claims, 9 Drawing Sheets

LOW TEMPERATURE SINTERABLE AND LOW LOSS DIELECTRIC CERAMIC COMPOSITIONS AND METHOD THEREOF

This is a 371 of PCT/KR00/00983, filed 30 Aug. 2000.

TECHNICAL FIELD

The present invention relates a high frequency dielectric ceramic compositions.

BACKGROUND ART

Recently, with the rapid development in a mobile communication and a satellite communication, a high frequency dielectric ceramics is in a high demand as a material for a high frequency integrated circuit or a dielectric resonator.

Major characteristics of the dielectric ceramics used for a high frequency includes a high dielectric constant ($\in_1$), a quality factor (Q) and a stable and tunable temperature factor ($\tau_1$) of a resonance frequency.

Representative high frequency dielectric compositions which have been widely known up to now are (Zr, Sn,)TiO$_4$ group, BaO—TiO$_2$ group, (Mg, Ca)TiO$_3$ group, and Ba—(Zn$_{1/2}$Ta$_{2/2}$)O$_3$, Ba(Mg$_{1/3}$Ta$_{2/3}$)O$_3$, Ba(Zn$_{1/3}$Nb$_{2/3}$)O$_3$ as Ba-peropskite group.

However, these compositions are disadvantages in hat they are mostly fired at a high temperature of 1,300–1,500° C. upper sum is not easy, a dielectric constant is low or a high-priced material should be used.

Besides, lately, advancement of a portable information communication devices lead to development of various types of boards and multi-chip module (MCM) by a multilayer chip high frequency devices or low temperature co-firing ceramics (LTCC), and a research and development of a low temperature firing high performance high frequency ceramics are conducted accordingly.

However, there are problems that the performance of the high frequency characteristic is considerably degraded such as, for example, most of them are not sufficient in terms of density when being fired at a low temperature, a dielectric constant is degraded according to addition of a firing material, a quality factor is degraded and a temperature factor is changed.

In addition, silver conduct or copper conduct with a small high frequency loss and a cofiring available low temperature firing high frequency dielectric ceramic are very rare.

Therefore, an object of the present invention is to provide a dielectric ceramics composition which can be fired at a very low temperature but has an excellent high frequency dielectric characteristic of various temperature compensation characteristics according to a high quality factor, a dielectric constant, a stable temperature factor and a composition, and can be implemented at a low cost.

Another object of the present invention is to provide a dielectric ceramics composition which can employ Ag, Cu, their alloy or a Ag/Pd alloy as an internal electrode and thus be used for various high frequency devices, such as a stacked chip capacitor, a stacked chip filter, a stacked chip capacitor/inductor composite device and a low temperature firing board, a resonator and a filter or a ceramic antenna.

DETAILED DESCRIPTION OF THE INVENTION

In order to achieve the above objects, there is provided a dielectric ceramics composition which is constructed by combining 1 mole of (Zn$_{1-x}$M$_x$)TiO$_3$ and yTiO$_2$ (0≦y≦0.8 and fired at a low temperature of 925–1,100° C., its preparation method, and a high frequency dielectric ceramics device using the same. In this respect, 'M' is one of Mg, Co, Ni, 'x' is 0≦x≦0.6 in case of Mg and 'x' is 0≦x≦1 in case of Co, and 0≦x≦1 in case of Ni

DETAILED DESCRIPTION OF THE INVENTION

MODE FOR CARRYING OUT THE PREFERRED EMBODIMENTS

The present invention will now be described with reference to accompanying drawings.

A high frequency dielectric ceramics composition of the present invention is characterized in that it has a very low firing temperature (925–1100° C.) compared to that of a conventional dielectric composition, has an excellent high frequency dielectric characteristic of various temperature compensation characteristics according to a high quality factor, a dielectric constant, a stable temperature factor and a composition and can be implemented with a low-priced material such as ZnO MgO, CoO, NiO, TiO$_2$.

In addition, the high frequency dielectric ceramics composition of the present invention is also characterized in that it employs Ag, Cu, their alloy or a Ag/Pd alloy as an internal electrode and thus be used for various high frequency devices, such as a stacked chip capacitor, a stacked chip filter, a stacked chip capacitor/inductor composite device and a low temperature firing board, a resonator and a filter or a ceramic antenna.

In the present invention, the low temperature firing composition of the present invention has an excellent quality factor (close to the existing high temperature firing composition) more than several times the existing one. In addition, in the claimed composition coverage, combination of composition having an excellent high frequency characteristic of the almost infinite number can be obtained compared to any of the conventional ones.

ZnTiO$_3$ (crystal structure has a rhombohedral symmetry) is phase-dissolved to Zn$_2$TiO$_4$ (cubic symmetry) and TiO$_2$ (rutile) at a higher temperature than 945° C. (refer to FIG. 303 of phase diagrams for ceramist, System ZnO—TiO$_2$ by Dulin and Rase), and thus, it in very difficult to be prepared.

In order to obtain a pure ZnTiO$_3$, phase synthesis and firing must be made at a below 945° C. A preliminary experiment of the present invention shows a result through an X-ray diffraction analysis that phase dissociation starts at near 925° C. so that a thermal treatment must be performed at below 925° C.

In the present invention, in order to remove the shortcomings, $Zn^{2+}$, a positive ion of A-site consisting an $ABO_3$ type ilmenite phase ceramics, is substituted with $Mg^{2+}$ (up to 0.6 mole), to thereby enlarge a thermal stabilization temperature of $ZnTiO_3$ to a high temperature range (refer to FIG. 2), so that the preparation process coverage is widened and the high frequency dielectric characteristics are highly improved.

A high frequency dielectric ceramics composition in accordance with a preferred embodiment of the present invention will now be described.

Material powder (an average particle diameter is 1 $\mu$m) of ZnO, MO (in this respect, MO is MgO, CoO or NiO) and $TiO_2$ (>99%) was weighed according to a composition range of $(Zn_{1-x}M_x)TiO_3$ and $yTiO_2$ (M is one of Mg, Co and Ni, x is $0 \leq x \leq 0.6$ in case of Mg, x is $0 \leq x \leq 1$ in case of Co, x is $0 \leq x \leq 1$ in case of Ni, and y is $0 \leq y \leq 0.8$), mixed in a wet ball mill method, dried at 120° C., and calcined and synthesized at a temperature of 850–950° C. for four hours.

The calcined powder was crushed and dried for 24 hours, to which an aqueous solution with 2 wt % of PVA binder added therein was sprayed to create a granule of about 200 $\mu$m size, with which a disk test sample was shaped having a diameter of 10 mm and a thickness of 4.8 MM under a pressure of 98 Mpa.

The shaped test sample was maintained at a temperature of 300–500° C. for more than 3 hours to burn out the binder and fired at a temperature of 925–1100° C. at an atmospheric pressure for 4 hours. At this time, a heat rising rate was 10° C./min.

The sintered test sample was ground with an SiC polishing paper (#1,500) to obtain about 0.45 ratio of diameter to thickness's of the test sample.

The high frequently dielectric characteristic was measured in a $TE_{0.15}$ mode by using a network analyzer (HP 8720C), and a dielectric constant was measure by a Hakki-Coleman method, a quality factor was measure by an open cavity method a temperature factor of a resonance frequency was measured by an invar cavity at a temperature range of +20–+70° C.

As a method for detecting the phase dissociation temperature of a compound, a DSC (differential scanning calorimetry) was used. A measurement condition was that $\alpha$-alumina was taken as a standard test sample and a test sample of about 20 mg was put in a platinum (Pt) crucible and measured in an air at a heat rising rate 10° C./min.

Figure 1:
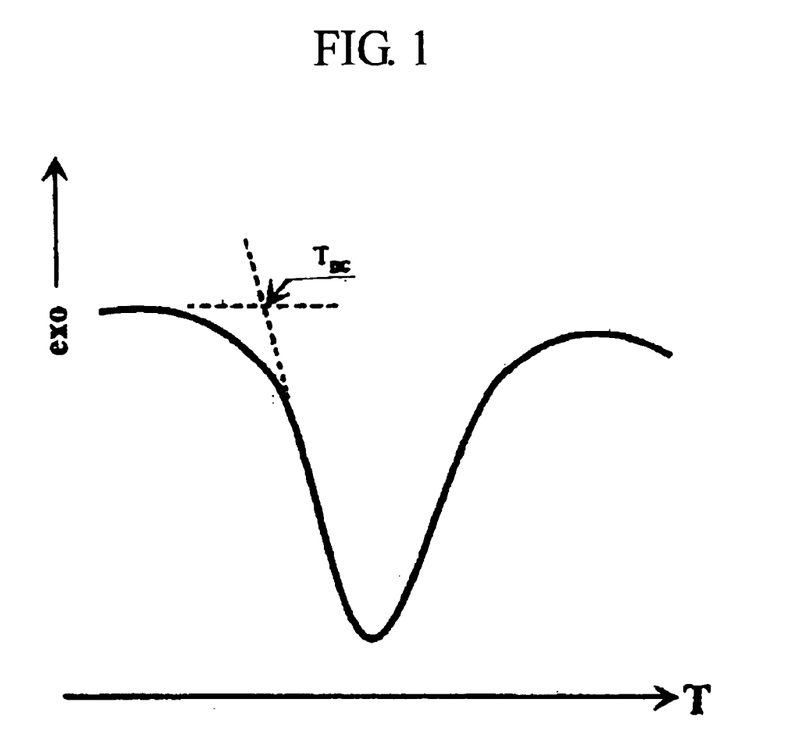
FIG. 1 is a graph showing a method for determining a phase dissociation temperature from a DSC curve.

FIG. 1 is a graph showing a method for determining a phase dissociation temperature based on a recommendation method of an ICTA from the DSC curve.

Figure 2:
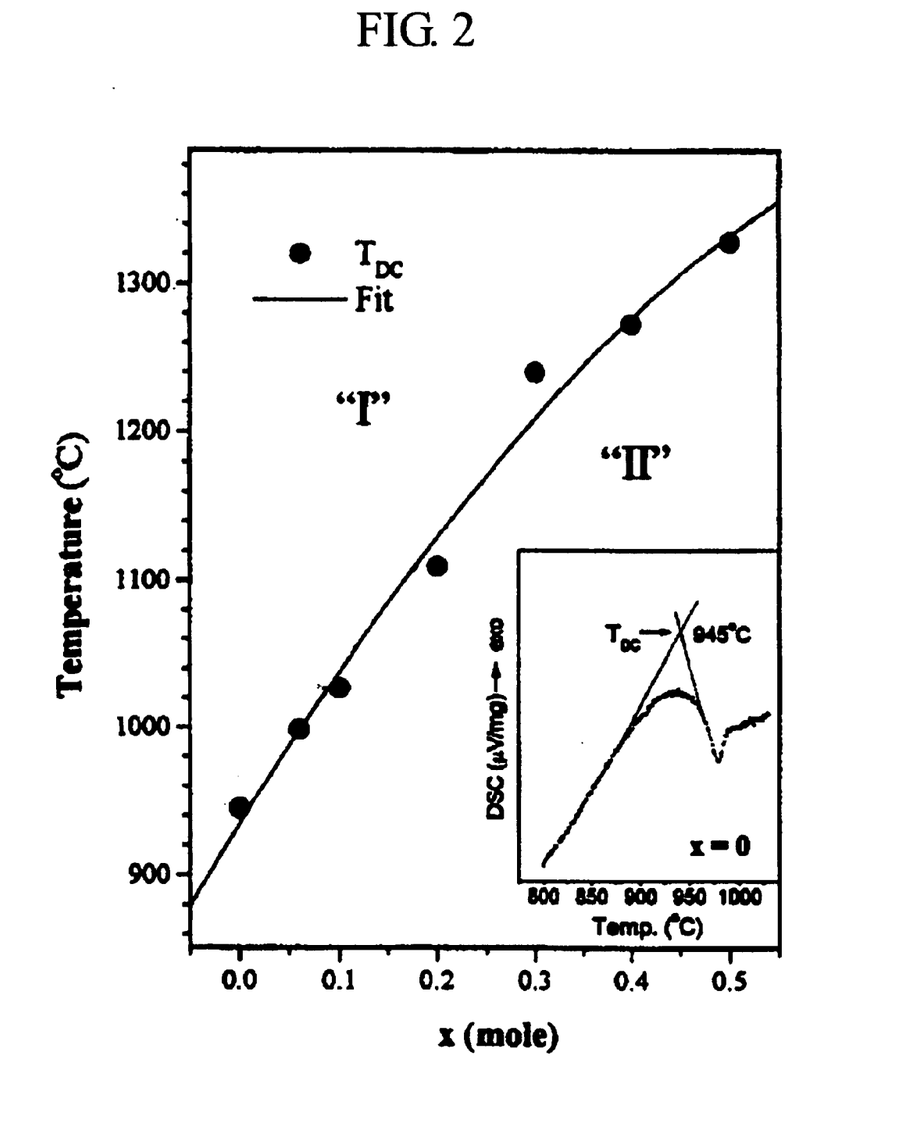
FIG. 2 is a graph showing a phase dissoiation temperature of (Zn$_{1-x}$Mg$_x$)TiO$_3$ according to a substituted amount of Mg.

FIG. 2 is a graph showing the phase dissociation temperature ($T_{oc}$) of: $(Zn_{1-x}Mg_x)TiO_3$ according to a substituted amount of Mg, in which it is noted that a dissociation temperature is moved up to a high temperature as the amount of Mg is increased, widening a phase stability region, so that it is easy to fabricate a synthetic powder.

In case of the region 'x'=0, $ZnTiO_3$ is dissociated at a temperature 945° C. and since the dissociation temperature is moved to a high temperature according to the substitution of Mg, a single phase of the $(Zn_{1-x}Mg_x)TiO_3$ solid solution can be easily synthesized or sintered even at the temperature of 945° C.

Accordingly, the single phase can be obtained anywhere in the range of 'region II' of FIG. 2. and this region is the phase synthesis region of the present invention.

Figure 3:
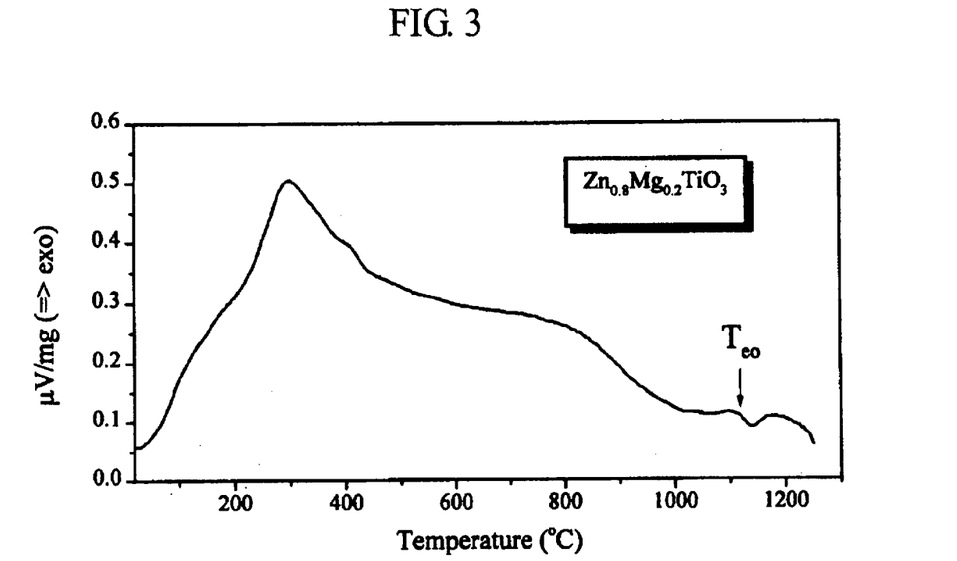
FIG. 3 is a graph showing a DSC curve of (Zn$_{0.5}$Mg$_{0.2}$)TiO$_3$ composition.
Figure 4:
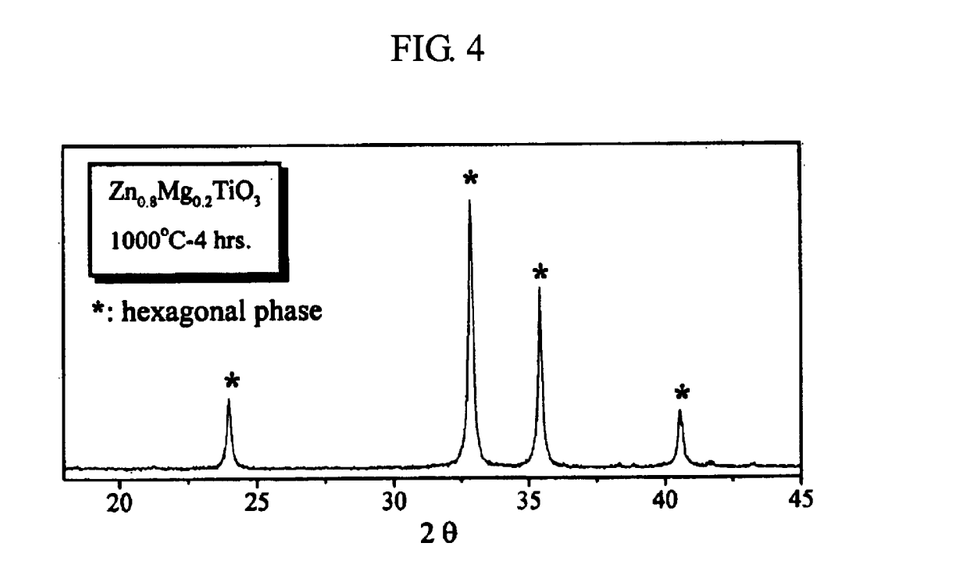
FIG. 4 illustrates an XRD pattern obtained when (Zn$_{0.5}$Mg$_{0.2}$)TiO$_3$ is heat-treated at a temperature of 1000° C. for 4 hours.

FIG. 3 is a graph showing a DSC curve of $(Zn_{0.5}Mg_{0.2})TiO_3$ composition, and FIG. 4 is a graph showing an XRD pattern in case that the $(Zn_{0.5}Mg_{0.2})TiO_3$ composition was heat-treated at a temperature of 1000° C. for four hours, which is a single phase $(Zn_{0.5}M_{0.2})TiO_3$.

On the basis of the obtained result, the region 'II' of FIG. 2 was selected as the phase synthesis temperature of $(Zn_{1-x}Mg_x)TiO_3$, and $0 \leq x \leq 0.1$ composition was heat-treated to be synthesized at a temperature of 900° C. for four hours, $0.1 \leq x \leq 0.6$ composition was heat-treated to be synthesized at a temperature: o 950° C. for four hours. Thereafter, it was observed that rhombohedral and/or hexagonal single phase of $(Zn_{1-x}Mg_x)TiO_3$ was formed through an XRD analysis.

Table 1 shows a microwave dielectric characteristic of $(Zn_{1-x}Mg_x)TiO_3$ $0 \leq x \leq 0.6$ composition.

In the composition range, a dielectric constant was 20–25, a quality factor was 38800–85900 GHz and a temperature factor of a resonance frequency was −25–−73 ppm/° C.

In case of a composition of x>0.6, due to an influence of the high temperature material MgO, the sintering temperature was higher than 1100° C. and a dielectric constant was below 20, so that a practicality and an economical efficiency are degraded.

TABLE 1

A high frequency dielectric characteristic of a dielectric resonator fabricated with $(Zn_{1-x}M_x)TiO_3$ (M = Mg, $0 \leq x \leq 0.6$)

| No. | X (mole) | Firing temperature (° C.) | Dielectric constant ($\epsilon_r$) | Quality factor (Zxf GHz) | Temperature factor |
|---|---|---|---|---|---|
| 1 | 0.01 | 925 | 21 | 36800 | −60 |
| 2 | 0.10 | 1000 | 25 | 58500 | −25 |
| 3 | 0.15 | 1050 | 25 | 83600 | −48 |
| 4 | 0.20 | 1050 | 22 | 82300 | −67 |
| 5 | 0.25 | 1050 | 22 | 71300 | −67 |
| 6 | 0.30 | 1050 | 21 | 77100 | −61 |
| 7 | 0.35 | 1050 | 21 | 84100 | −63 |
| 8 | 0.40 | 1050 | 21 | 88900 | −73 |
| 9 | 0.45 | 1050 | 21 | 73600 | −68 |
| 10 | 0.50 | 1050 | 20 | 81200 | −54 |
| 11 | 0.55 | 1050 | 20 | 78200 | −56 |
| 12 | 0.60 | 1100 | 20 | 85900 | −55 |

Meanwhile, with a method for preventing reduction of the temperature compensation characteristic allowing a negative temperature factor of $(Zn_{1-x}Mg_x)TiO_3$ to be controllable to a value of a range of ±10 ppm/° C. suitable for application of a high frequency device and the high quality factor and the dielectric constant, the excellent dielectric characteristics of $(Zn_{1-x}Mg_x)TiO_3$, $(Zn_{1-x}Mg_x)TiO_3+yTiO2$ ($0 \leq y \leq 0.8$) composite ceramics of which a temperature factor positive (+430 ppm/° C.), a dielectric constant is about 105, a quality factor is about 1000(4 GHz) and TiO2 was added was fabricated.

Table 2 shows a high frequency dielectric characteristic of the composite ceramics, and especially, when a composition of which 'x' was in the range of 0.15–0.55, an excellent dielectric characteristic having a dielectric constant of 25–30, a quality factor of 8000–100000 GHz and a temperature factor of ±10 ppm/° C. was obtained.

Table 2: A high frequency dielectric characteristic of a dielectric resonator fabricated with $(Zn_{1-x}M_x)TiO_3+yTiO_2$ (M=Mg, $0 \leq x \leq 0.6$)

| No. | X (mole) | Y (mole) | Firing temperature (° C.-4 hrs) | Di-electric constant | Quality factor (Qxf GHz) | Temperature factor (τ f: ppm/° C.) |
|---|---|---|---|---|---|---|
| 13 | 0.01 | 0.2 | 925 | 23 | 42700 | −24 |
| 14 |  | 0.3 |  | 28 | 29000 | +9 |
| 15 |  | 0.4 |  | 29 | 27900 | +29 |
| 16 |  | 0.6 |  | 33 | 24100 | +53 |
| 17 |  | 0.8 |  | 35 | 22000 | +74 |
| 18 | 0.10 | 0.2 | 1000 | 31 | 51900 | +23 |
| 19 |  | 0.3 |  | 33 | 47300 | +51 |
| 20 |  | 0.4 |  | 35 | 43700 | +62 |
| 21 |  | 0.6 |  | 40 | 41900 | +103 |
| 22 |  | 0.8 |  | 46 | 41300 | +134 |
| 23 | 0.15 | 0.2 | 1050 | 30 | 80100 | +4 |
| 24 |  | 0.3 |  | 32 | 74800 | +12 |
| 25 |  | 0.4 |  | 34 | 68400 | +42 |
| 26 |  | 0.6 |  | 39 | 57600 | +99 |
| 27 |  | 0.8 |  | 44 | 55200 | +128 |
| 28 | 0.20 | 0.2 | 1050 | 28 | 97700 | −24 |
| 29 |  | 0.3 |  | 30 | 107000 | +1 |
| 30 |  | 0.4 |  | 32 | 83900 | +26 |
| 31 |  | 0.5 |  | 37 | 78800 | +84 |
| 32 |  | 0.6 |  | 45 | 72100 | +117 |
| 33 | 0.25 | 0.2 | 1050 | 27 | 83500 | −22 |
| 34 |  | 0.3 |  | 28 | 101000 | +3 |
| 35 |  | 0.4 |  | 32 | 84900 | +28 |
| 36 |  | 0.6 |  | 37 | 77900 | +64 |
| 37 |  | 0.8 |  | 42 | 70700 | +104 |
| 38 | 0.30 | 0.2 | 1100 | 27 | 89100 | −18 |
| 39 |  | 0.3 |  | 30 | 101600 | +3 |
| 40 |  | 0.4 |  | 32 | 83600 | +22 |
| 41 |  | 0.6 |  | 36 | 82000 | +73 |
| 42 |  | 0.8 |  | 40 | 74100 | +103 |
| 43 | 0.35 | 0.2 | 1100 | 28 | 84300 | −17 |
| 44 |  | 0.3 |  | 30 | 99700 | +6 |
| 45 |  | 0.4 |  | 32 | 90700 | +19 |
| 46 |  | 0.6 |  | 36 | 81300 | +78 |
| 47 |  | 0.8 |  | 40 | 73400 | +112 |
| 48 | 0.40 | 0.2 | 1050 | 25 | 83100 | −18 |
| 49 |  | 0.3 |  | 28 | 102500 | −1 |
| 50 |  | 0.4 |  | 30 | 85500 | +25 |
| 51 |  | 0.6 |  | 35 | 86500 | +65 |
| 52 |  | 0.8 |  | 38 | 68400 | +108 |
| 53 | 0.45 | 0.2 | 1050 | 25 | 69300 | −18 |
| 54 |  | 0.3 |  | 27 | 80200 | +6 |
| 55 |  | 0.4 |  | 29 | 74200 | +34 |
| 56 |  | 0.6 |  | 34 | 72900 | +60 |
| 57 |  | 0.8 |  | 37 | 69800 | +115 |
| 58 | 0.50 | 0.2 | 1050 | 23 | 69800 | −27 |
| 59 |  | 0.3 |  | 23 | 69200 | −17 |
| 60 |  | 0.4 |  | 22 | 68800 | −14 |
| 61 |  | 0.6 |  | 27 | 97400 | +1 |
| 62 |  | 0.8 |  | 34 | 78200 | +62 |
| 63 | 0.55 | 0.2 | 1050 | 21 | 73400 | −52 |
| 64 |  | 0.3 |  | 22 | 82300 | −39 |
| 65 |  | 0.4 |  | 22 | 72900 | −35 |
| 66 |  | 0.6 |  | 23 | 72200 | −18 |
| 67 |  | 0.8 |  | 25 | 87000 | −3 |
| 68 | 0.60 | 0.2 | 1050 | 21 | 77100 | −64 |
| 69 |  | 0.3 |  | 20 | 65600 | −64 |
| 70 |  | 0.4 |  | 20 | 58500 | −62 |
| 71 |  | 0.6 |  | 20 | 45000 | −55 |
| 72 |  | 0.8 |  | 19 | 43200 | −47 |

Such high frequency performance is second to Ba(Zn$_{1/3}$Ta$_{2/3}$)O$_3$ or Ba(Mg$_{1/3}$Ta$_{2/3}$)O$_3$ group ceramics.

Comparatively, the conventional dielectrics are sintered at a high temperature of 1500° C. and use high-priced material such as Ta2O5, but the composition of the present invention uses a low-priced material. And, the most of conventional ceramics compositions obtain a usable dielectric characteristic only in limited range, while the composition of the present invention has an excellent dielectric characteristic in a wide range of solid solution without a firing material at a temperature of 1000–1100° C., and theoretically, in the present invention, combinations of an infinite number of usable high frequency dielectric ceramics composition can be obtained. The aforementioned is about M=Mg in (Zn$_{1-x}$M$_x$)TiO$_3$ composition.

In the present invention, Co or Ni can be used as a diatomic positive ion substitute source for Zn ion. The reason for this is that CoTiO$_3$ and NiTiO$_3$ as well as ZnTiO$_3$ or MgTiO$_3$ also have a hexagonal crystal structure and are able to form a solid solution with respect to Zn ion and Co or Ni ion.

(Zn$_{1-x}$M$_x$)TiO$_3$ solid solution has an unstable phase at a high temperature and dissociated into (Zn$_{1-x}$M$_x$)TiO4 and TiO$_2$. When Zn is substituted with Co or Ni, like Mg, hexagonal phase stabilization range is widened, an effect that the present invention intends to attain.

Figure 5A:
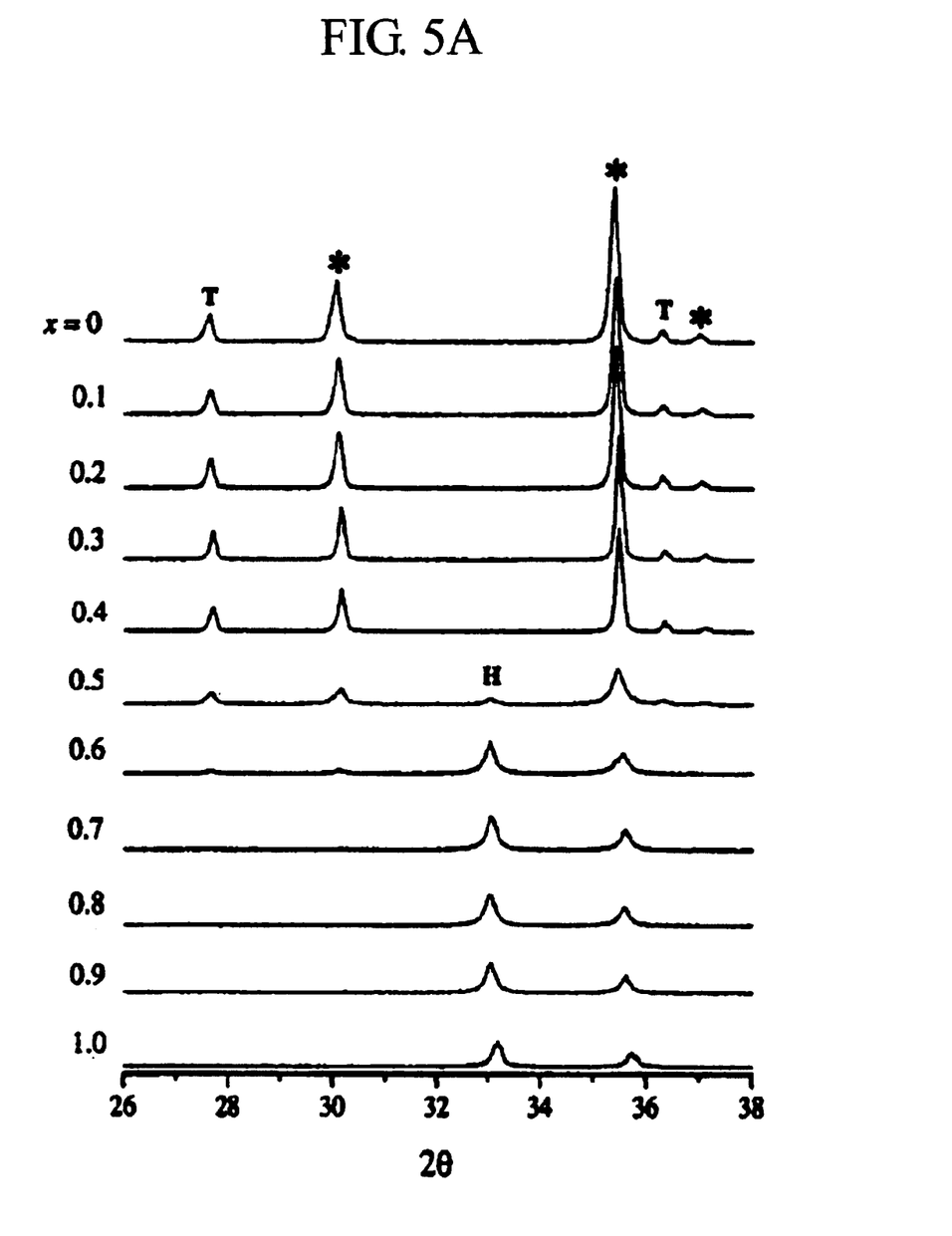
FIGS. 5A and 5B illustrate XRD patterns each obtained after (Zn$_{1-x}$Co$_x$)TiO$_3$ is calcined at temperatures of 1000° C. and 1150° C. for four hours.
Figure 5B:
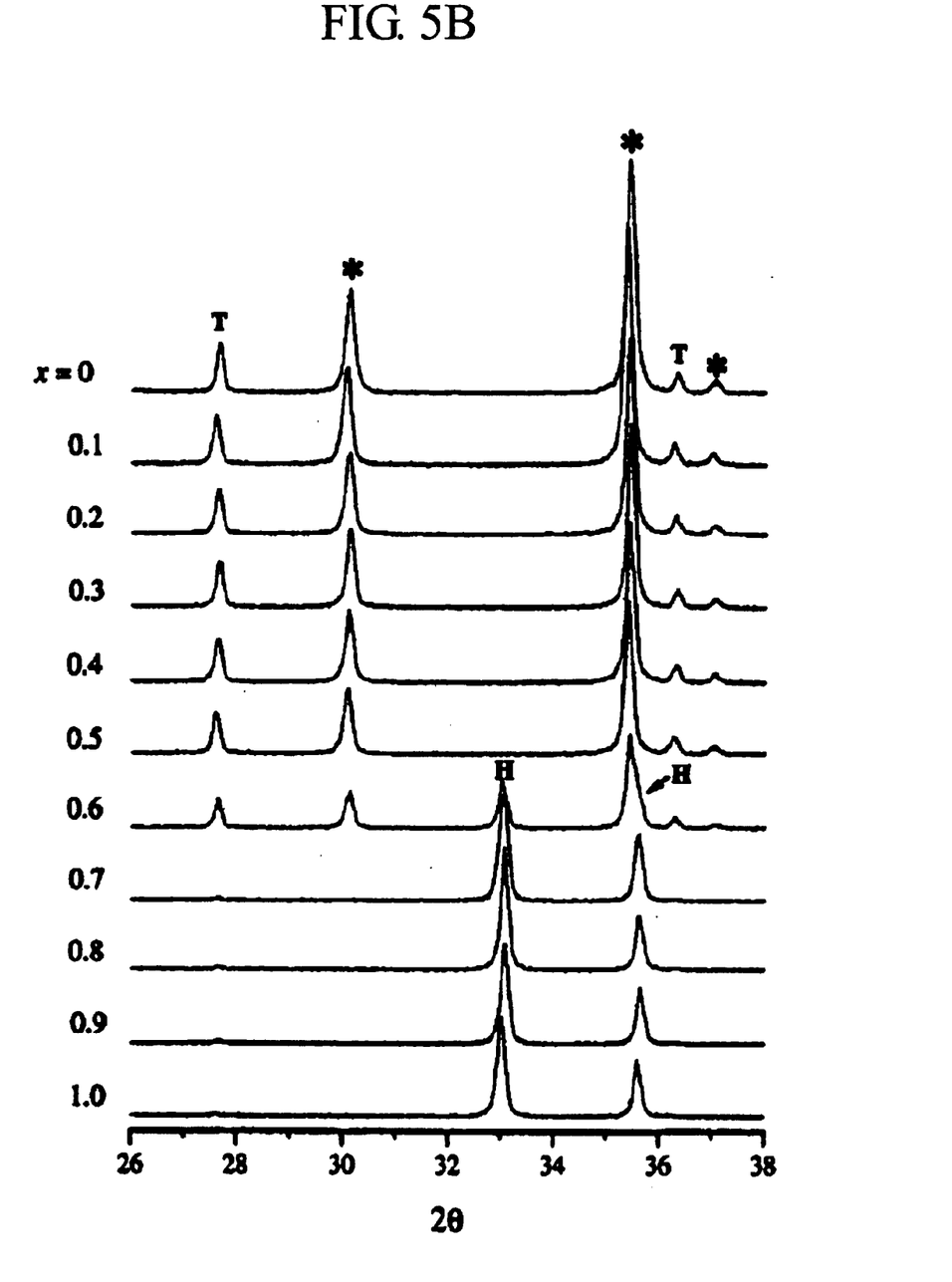
Figure 6A:
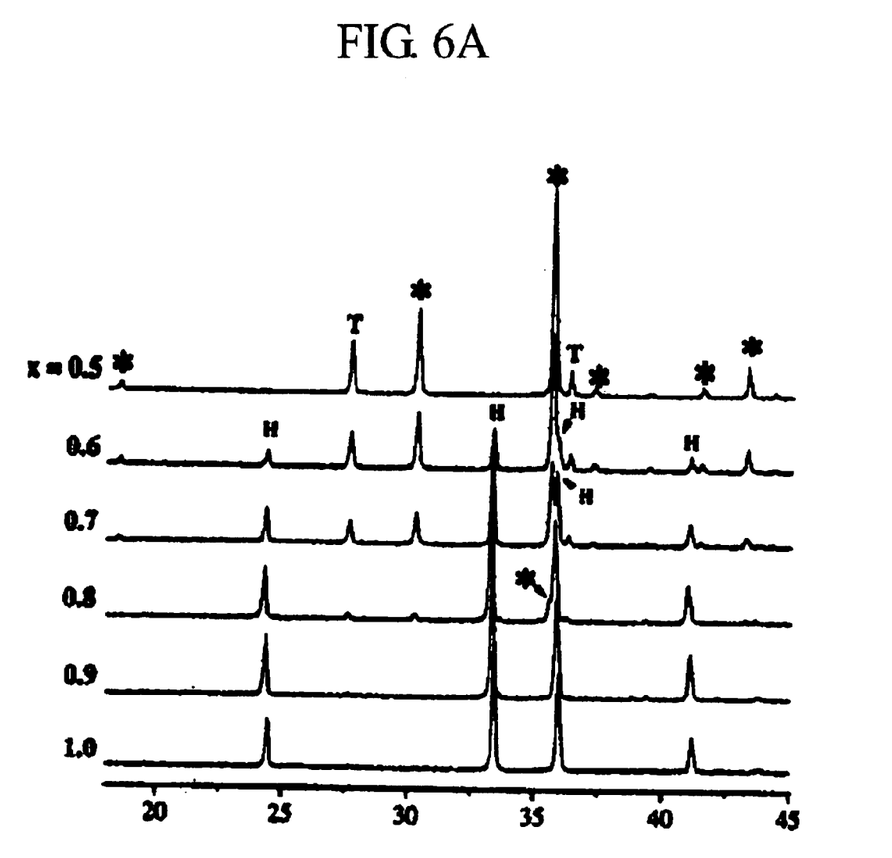
FIGS. 6A and 6B illustrate XRD patterns each obtained after (Zn$_{1-x}$Ni$_x$)TiO$_3$ is calcined at temperatures of 1000° C. and 1150° C. for four hours.
Figure 6B:
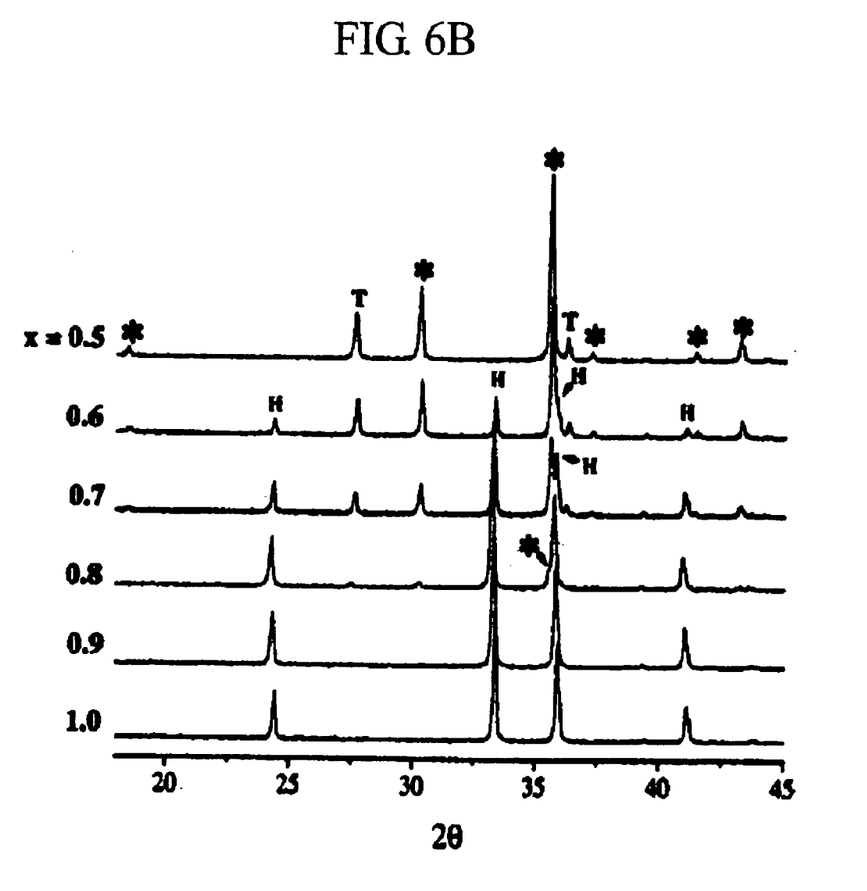

FIGS. 5A and 5B are graphs showing X-ray diffraction analysis results after (Zn$_{1-x}$Co$_x$)TiO$_3$ is calcined at temperatures of 1000° C. and 1150° C. for four hours, and FIGS. 6A and 6B are graphs showing X-nay diffraction analysis results after (Zn$_{1-x}$Ni$_x$)TiO$_3$ is calcined at temperatures of 1000° C. and 1150° C. for four hours.

With reference to FIGS. 2, 4, 5A, 5B, 6A and 6B, in the (Zn$_{1-x}$M$_x$)TiO$_3$ (M=Mg, Co or Ni) solid solution, a thermal phase stability is notably (Zn$_{1-x}$Mg$_x$)TiO$_3$>(Zn$_{1-x}$Co$_x$)TiO$_3$>(Zn$_{1-x}$Ni$_x$)TiO$_3$.

Accordingly, like the (Zn$_{1-x}$Mg$_x$)TiO$_3$+xTiO$_3$ temperature stable microwave ceramics, the cases of Co and Ni also have the similar effect to the results as shown in Table 1 and 2.

With reference to FIGS. 5A, 5B, 6A and 6B, it is noted that the lower the thermal treatment temperature is, the lower the stability range of the hexagonal solid solution is, and a phase stability can be implemented for these compositions in the same manner as shown in FIGS. 1 and 2.

Figure 7:
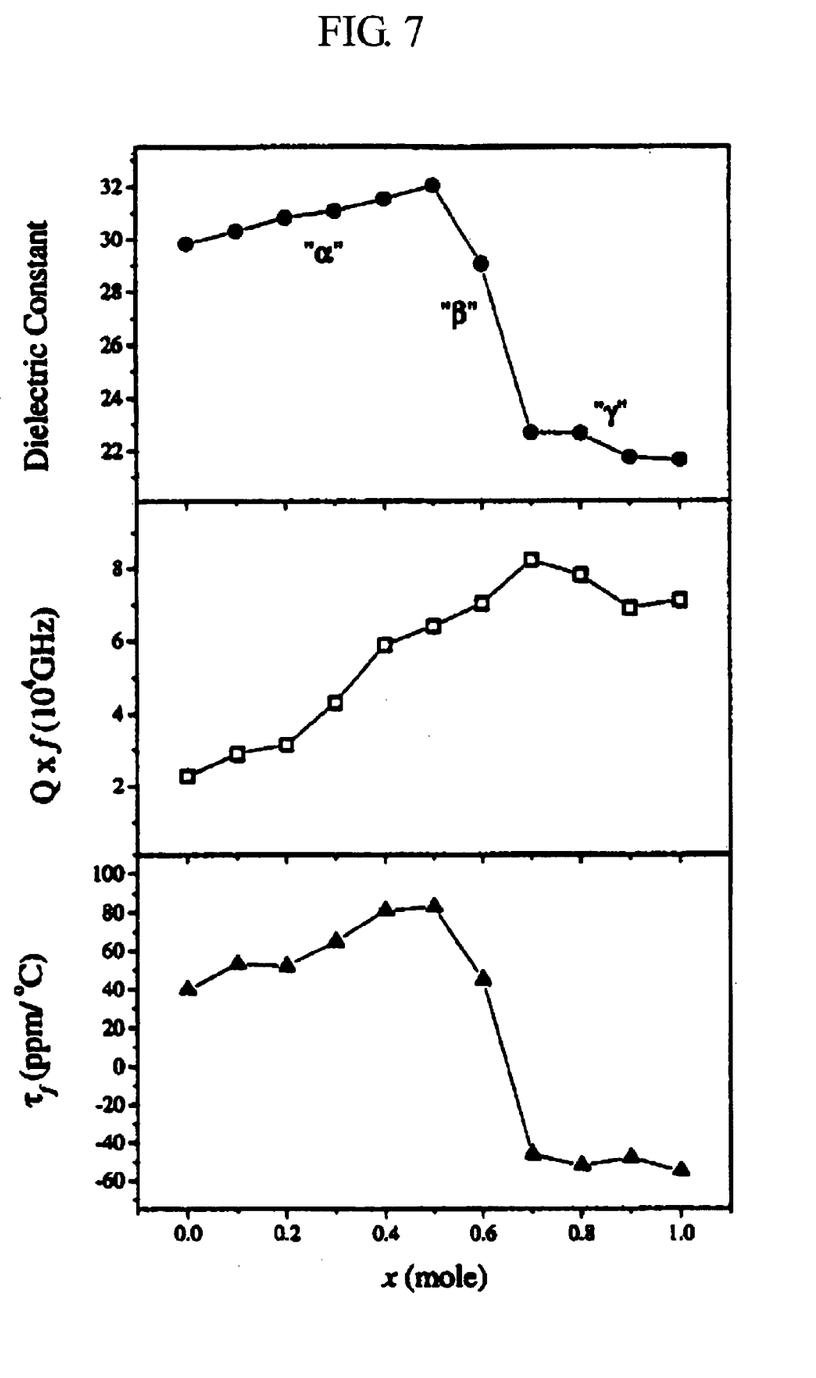
FIG. 7 is a graph showing a microwave dielectric characteristic of (Zn$_{1-x}$Co$_x$)TiO$_3$.
Figure 8:
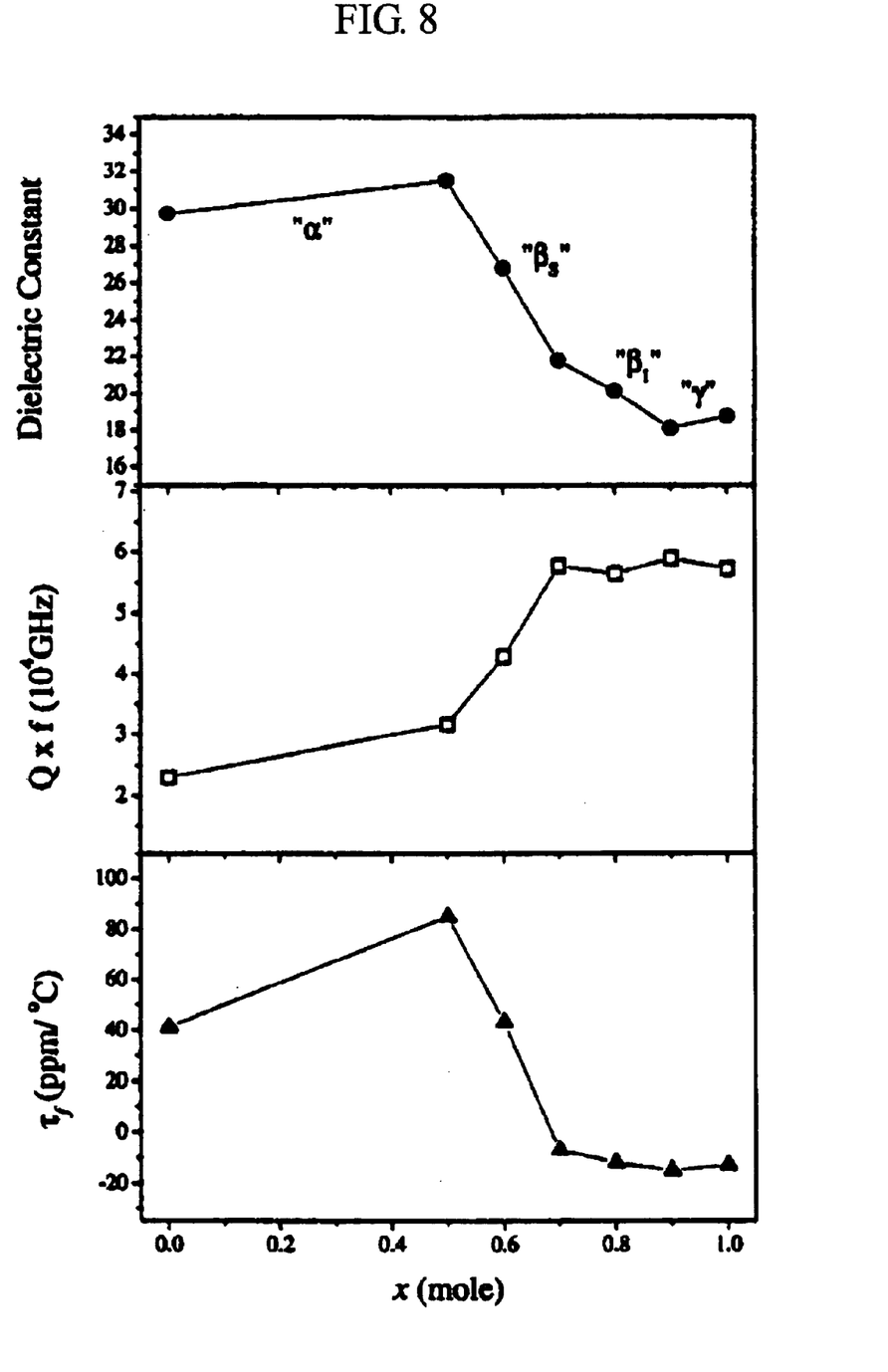
FIG. 8 is a graph showing a microwave dielectric characteristic of (Zn$_{1-x}$Ni$_x$)TiO$_3$.

FIGS. 7 and 8 respectively show a microwave dielectric characteristic of a test sample that (Zn$_{1-x}$Co$_x$)TiO$_3$ and (Zn$_{1-x}$Ni$_x$)TiO$_3$, the substitute solid solution of Co and Ni, were sintered at a temperature of 1150° C. for four hours.

From the results of FIGS. 7 and 8, in the (Zn$_{1-x}$M$_x$)TiO$_3$ (M=Co or Ni and 0≦x≦1) composition, a microwave characteristic having a temperature factor of '0' and excellent dielectric characteristic can be obtained.

In FIGS. 7 and 8, 'α' region is a co-existence region of (Zn$_{1-x}$M$_x$)TiO$_4$ (Cubic) phase and TiO$_2$(rutile) phase of FIGS. 5 and 6, and 'β' region is a co-existence region of (Zn$_{1-x}$M$_x$)$_2$TiO$_4$ (Cubic) phase+(rutile) phase+(Zn$_{1-x}$M$_x$)TiO$_3$ (hexagonal) phase, where the condition that the temperature factor is '0' is obtained. The reason for this is that the temperature factors of (Zn$_{1-x}$M$_x$)$_2$TiO$_4$ phase and (Zn$_{1-x}$M$_x$)TiO$_3$ phase are respectively negative and the temperature factor of TiO$_2$ phase is positive, so that a compensation is made for the temperature factors in their suitable mixed phase, and thus, they have the value of '0'.

However, as for the results of FIGS. 7 and 8, there are problems that the condition that the temperature factor is '0' inches the cubic crystal (Zn$_{1-x}$M$_x$)$_2$TiO$_4$ phase having somewhat low quality factor, that is, having the relatively lower quality factor than to hexagonal crystal (Zn$_{1-x}$M$_x$)TiO$_3$, and the composition having the temperature factor of '0' varies according to a sintering temperature.

Accordingly, likewise in the above described embodiment of Table 1 and 2, it is important to perform calcining of powder in (Zn$_{1-x}$M$_x$)TiO$_3$ (M=Co or Ni) in the stable range of the hexagonal crystal.

In such a case, the temperature compensation can be possibly performed by properly mixing the hexagonal crystal phase of $(Zn_{1-x}M_x)TiO_3$ having the high quality factor and the negative temperature factor and $TiO_3$ (rutile) phase having the high quality factor and the positive temperature factor.

Accordingly, likewise of the embodiment of Table 1 and 2, a microwave dielectric having the high quality factor and the stable temperature coefficient can be obtained. That is, a usable microwave characteristic can be obtained from the composition of $(Zn_{1-x}M_x)TiO_3$ and $yTiO_2$ (M is Co or Ni, $0 \leq x \leq 1$, $0 \leq y \leq 0.8$).

The effect of the present invention is not limited thereto. That is, for example, an effect by mixing more than two of A-site atoms constituting the above mentioned $ABO_3$ type ilmenite phase ceramics can be obtained. Namely it refers to a mixture of $(Zn_{1-a}Mg_{1-b}Co_{1-c}Ni_{1-d})TiO_3$ ($0 \leq a \leq 1$, $0 \leq b \leq 1$, $0 \leq c \leq 1$, $0 \leq d \leq 1$).

The mixture of $(Zn_{1-a}Mg_{1-b}Co_{1-c}Ni_{1-d})TiO_3$ is calcined (synthesized) in a stable temperature range of the ilmenite phase, into which a suitable amount of $TiO_2$ (rutile) is added up to $0 \leq y \leq 0.8$, or $(Zn_{1-a}Mg_{1-b}, Co_{1-c}Ni_{1-d})TiO_3$ and $yTiO_2$ are mixed by one time and calcined in a stable temperature range of the ilmenite phase.

In this respect, oxide, carbonate, nitrate, alkoxide and the like can be used as a material for ZnO, MgO, CoO and NiO, and anatase or rutile can be used as a material for $TiO_2$.

Industrial Applicability

As so far described, a high frequency dielectric characteristic having an excellent various temperature compensation varied according to the high quality factor, the dielectric constant and the stable temperature factor and composition but having a very low sintering temperature compared with the conventional dielectric composition can be implemented at a low-priced material such as ZnO. MgO, CoO, NiO or $TiO_2$.

In addition, since Ag, Cu or their alloy or Ag/Pd ally can be used as an internal electrode, and thus, can be used as various high frequency devices, i.e., a stacked chip capacitor, a stacked chip filter, a stacked chip capacitor/inductor composite device and a low-temperature sintered substrate, a resonator and a filter or a ceramic antenna.

Especially, the low-temperature a sintered composition obtains a remarkably high quality factor more than several times that of the conventional one.

In addition, combination of the almost infinite number of compositions exhibiting the excellent high frequency characteristic can be obtained in the composition range of the present invention.

What is claimed is:
1. A high frequency dielectric ceramics composition constituted by combining $(Zn_{1-x}M_x)TiO_3$ and $yTiO_2$ satisfies the conditions of:
M is Mg, Co or Ni, 'x' is [$0 \leq x \leq 0.6$] $0 < x \leq 0.6$ in case of Mg and 'x' is [$0 \leq x \leq 1$] $0 < x \leq 1$ in case of Co, and [$0 \leq x \leq 1$] $0 < x \leq 1$ in case of Ni, and [$0 \leq y \leq 0.8$] $0 < y \leq 0.8$.

2. High frequency devices comprising the composition of claim 1.

3. The high frequency devices of claim 2, wherein the high frequency devices are selected from the group consisting of a stacked chip capacitor, a stacked chip filter, a stacked chip capacitor/inductor composite device and a module, a low-temperature sintered substrate, a resonator, a filter, a ceramic antenna and combinations thereof.

4. A high frequency dielectric ceramics composition preparation method in which material powder of ZnO, MO (in this respect, MO is MgO, CoO or NiO) and $TiO_2$ is weighed according to a composition range of $(Zn_{1-x}M_x)TiO_3$ and $yTiO_2$ (M is one of Mg, Co and Ni, x is $0 \leq x \leq 0.6$ in case of Mg, x is $0 \leq x \leq 1$ in case of Co, x is $0 \leq x \leq 1$ in case of Ni, and y is $0 \leq y \leq 0.8$), mixed and dried,
calcined at a temperature of 850–950° C.,
the calcined powder is crushed,
the crushed power is shaped,
the shaped body is fired at a temperature of 925–1100° C., and
$(Zn_{1-x}M_x)TiO_3$ is calcined at a temperature corresponding to a region (region II) of below a phase dissociation temperature as shown in FIG. 2 to obtain $(Zn_{1-x}M_x)TiO_3$ (M is Mg, Co or Ni) of a single phase of rhombohedral/hexagonal crystal.

5. The method of claim 4, wherein the shaped body is made in a manner that an aqueous solution adding a PVA binder is sprayed onto the crushed powder to make a granule, to which a pressure is applied.

6. The method of claim 5, further comprises a step for maintaining the shaped body at a temperature of 300–500° C. for a predetermined time and removing the binder.

7. The method of claim 4, wherein $(Zn_{1-x}M_x)TiO_3$ is first calcined and $yTiO_2$ ($0 \leq y \leq 0.8$) is added to $(Zn_{1-x}M_x)TiO_3$ and then sintered.

8. The method of claim 4, wherein $(Zn_{1-x}M_x)TiO_3$ and yTiO2 are sintered at the same time and sintered.

9. The method of claim 4, wherein TiO2 is anatase or rutile.

10. A high frequency dielectric ceramics composition constituted from combination of $(Zn_{1-a}Mg_{1-b}Co_{1-c}Ni_{1-d})TiO_3$ and $yTiO_2$ ($0 \leq a \leq 1$, $0 \leq b \leq 1$, $0 \leq c \leq 1$, $0 \leq d \leq 1$), and $0 \leq y \leq 0.8$.

* * * * *